United States Patent [19]

Suzuki

[11] Patent Number: 5,631,886
[45] Date of Patent: May 20, 1997

[54] TRACKING CONTROL APPARATUS FOR OPTICAL DISK

[75] Inventor: Haruyuki Suzuki, Yokohama, Japan

[73] Assignee: Ricoh Company, Ltd., Tokyo, Japan

[21] Appl. No.: 237,956

[22] Filed: May 3, 1994

Related U.S. Application Data

[63] Continuation of Ser. No. 915,345, Jul. 17, 1992, abandoned.

[30] Foreign Application Priority Data

Jul. 18, 1991 [JP] Japan ................................. 3-202294

[51] Int. Cl.$^6$ ................................................. G11B 7/085
[52] U.S. Cl. ........................ 369/44.25; 369/44.29; 369/44.32
[58] Field of Search .......................... 369/44.11, 44.25, 369/44.28, 44.29, 44.32, 44.34, 44.35, 54, 58, 32; 360/78.01, 78.04, 78.06, 78.07, 78.05

[56] References Cited

U.S. PATENT DOCUMENTS 5,123,002  6/1992  Tateishi ................................. 369/44.25
5,182,736  1/1993  Yanagi ................................... 369/78.06
5,218,588  6/1993  Suzuki .................................. 369/44.27
5,222,057  6/1993  Suzuki et al. ......................... 369/44.26
5,307,333  4/1994  Ikeda et al. .......................... 369/44.28

OTHER PUBLICATIONS

K. Bulthuis, et al., "Ten billion bits on a disk", IEEE spectrum, pp. 26-33, Aug. 1979.

K. Torazawa, et al., "Erasable digital audio disk system", Applied Optics, vol. 25, No. 22, pp. 3990-3995, Nov. 15, 1986.

*Primary Examiner*—Thang V. Tran
*Attorney, Agent, or Firm*—Cooper & Dunham LLP

[57] ABSTRACT

Disclosed is a tracking control apparatus for an optical disk. The optical head of the optical disk system generates a tracking error signal for servo tracking. The tracking error signal is also employed to judge whether the light spot is present in the tracking enable region of the disk. If the light spot is judged out of the tracking enable region, the optical head is moved inwardly or outwardly in the radial direction of the disk until the light spot is present in the tracking enable region to activate tracking servo.

9 Claims, 6 Drawing Sheets

TRACKING CONTROL APPARATUS FOR OPTICAL DISK

This is a continuation of application Ser. No. 07/915,345 filed Jul. 17, 1992 now abandoned.

BACKGROUND OF THE INVENTION

1. Field of the Invention

The present invention relates to a tracking control apparatus for an optical disk, such as an optical disk of pit-formation type, a magneto-optical disk, etc. More particularly, the invention relates to a tracking control apparatus capable of performing an accurate tracking action with no use of extra position sensor or switch and without a high accuracy of finishing or processing.

2. Description of the Related Art

In an optical disk, an optical head with an objective lens mounted thereon is arranged to be movable in a radial direction of the disk to make an access to an arbitrary track on the disk.

K. Bulthuis, M. G. Carasso, J. P. J. Heemskerk, P. J. Kivits, W. J. Kleuters, and P. Zalm, "Ten billion bits on a disk," IEEE spectrum, pages 28 through 33, August 1979 describes tracking servo control of the conventional optical disk of pit-formation type. K. Torazawa, S. Sumi, S. Murata, S. Minechika, and Y. Ishii, "Erasable digital audio disk system", Applied Optics, Vol. 25, No. 22, pages 3995, 15 Nov. 1986 describes tracking servo with push-pull method of the conventional magneto-optical disk.

Such conventional optical disk apparatus executes an initial action in the following four steps.

In the first step, the objective lens is vertically moved to the disk to position an optical spot converged at the objective's focal point within a vertical range, where a focusing servo control may be implemented near a recording layer of the disk.

In the second step, the focusing servo is activated.

In the third step, a tracking servo is activated to make the optical spot follow a track on the disk.

In the fourth step, address information is read from the track on which the optical spot is centered.

In the conventional optical disk apparatus, the optical head is moved in the radial direction of the disk within a head movable range in which the head can move radially, to make an access to an arbitrary track in the tracking enable region on the disk.

The head movable range must be designed such that the optical head can move to all tracks even with the narrowest possible range which could occur by errors upon processing and assembling.

Actually, the head movable range is widely set taking into consideration an eccentricity of the disk itself, vibrations and positional displacement of the spindle motor, and other factors.

Supposing the head movable range, which is preliminarily widely set for the above reason, has become for example the widest due to the errors upon processing and assembling of apparatus, and if the optical head is positioned at an edge of the head movable range, there is a possibility that the tracking enable region is absent on the optical axis of the objective lens. The tracking enable region is the region where guide grooves, servo marks or the likes are formed.

Then, before servo tracking or pull-in action, the optical head is required to move in the radial direction of the disk in the head movable range to be located in the tracking enable region.

In order to judge whether the optical head is present in the tracking enable region or not, a sensor or switch has been disposed to detect a position of optical head in the radial direction of the disk, raising a cost.

If the processing errors and the disk eccentricity are minimized in order to omit such a sensor or switch, the optical head would be always present within the tracking enable region wherever the optical head is located in the radial direction of the disk.

However, this causes another problem to raise a processing cost and a production cost of disk.

SUMMARY OF THE INVENTION

It is an object of the present invention to provide a tracking control apparatus capable of performing an accurate tracking with no use of position sensor or switch and without a high processing precision, solving the above-described problems in the conventional disk apparatus, that is, an increase in cost for example with necessity of position sensor or switch when the range where the optical head can track is widely set, or with necessity of high processing precision when the range where the optical head can track is narrowly set.

The object of the present invention can be achieved by a tracking control apparatus for an optical disk, comprising: an optical head for emitting light beam on the disk, and outputting at least a tracking error signal; means for moving the optical head in the radial direction of the disk; means for judging based on the tracking error signal whether a light spot of the light beam emitted from the optical head is present in the tracking enable region of the disk; and means for keeping the optical head move inwardly or outwardly in the radial direction of the disk when the light spot is judged to be out of the tracking enable region.

Further objects and advantages of the present invention will be apparent from the following description of the preferred embodiments of the invention as illustrated in the accompanying drawings.

DESCRIPTION OF THE PREFERRED EMBODIMENTS

A tracking control apparatus according to the present invention will be explained with reference to the accompanying drawings, comparing its embodiments with a conventional apparatus in the related art.

A conventional tracking control apparatus is first explained with reference to FIG. 1.

Figure 1:
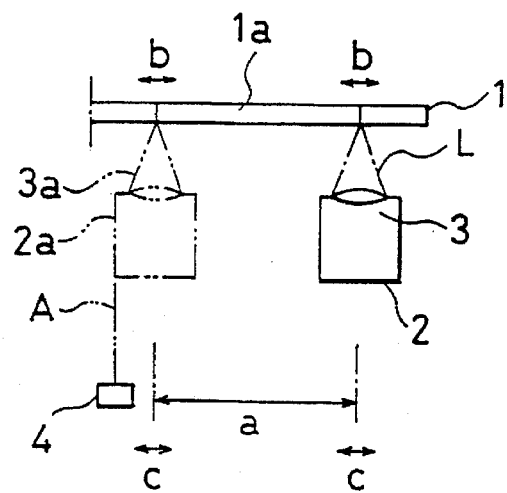
FIG. 1 shows an example of main structure of disk and optical head in the conventional optical disk apparatus in the related art.

In FIG. 1, reference character 1 denotes a optical disk, only a half of it being schematically shown in a cross-sectional view. Reference character 1a denotes a tracking enable region. Reference characters 2 and 3 denote respectively an optical head and an objective lens incorporated in it at its rightmost position. Reference characters 2a and 3a denote respectively the optical head and the objective lens incorporated in it at its leftmost position. Reference character 4 denotes a position sensor in a radial direction of the disk. Reference character A denotes a sensing position of the sensor 4. Reference character L denots an optical beam emitted. Reference character a denotes a head movable range. Reference character b with bidirectional arrow denotes an eccentricity range of the disk 1. Reference character c with bidirectional arrow denotes an error of the movable range of the optical head.

As shown in FIG. 1, if the optical head is at the rightmost position as denoted by reference character 2, it is moved left in the head movable range a or in a radial direction of the disk 1 in FIG. 1 to make an access to an arbitrary track in the tracking region 1a of the disk. On the contrary, if the optical head is at the leftmost position as denoted by reference character 2a, it is moved right in the head movable range a or in a radial direction of the disk 1 in FIG. 1 to make an access to an arbitrary track in the tracking region 1a of the disk.

The head movable range a must be designed such that the optical head can move to all tracks even with the narrowest possible range which could occur by errors upon processing and assembling.

Actually, the head movable range a is widely set taking into consideration an eccentricity of the disk 1 (arrow b) itself, vibrations and positional displacement of the spindle motor, and other factors.

Supposing the head movable range a which is preliminarily widely set for the above reason becomes for example the widest due to the errors upon processing and assembling of the apparatus, and if the optical head is positioned at an edge of head movable range a, there is a possibility that the tracking enable region is absent on the optical axis of the objective lens 3 or 3a. The tracking enable region is a region where guide grooves, servo marks or the likes are formed.

Then, before servo tracking or pull-in action, the optical head 2 or 2a is required to move in the radial direction of the disk 1 in the head movable range a to be located in the tracking enable region.

In order to judge whether the optical head is present in the tracking enable region or not, a sensor 4 or switch is disposed to detect a position of the optical head in the radial direction of the disk, raising a cost.

Now, a first embodiment of the tracking control apparatus according to the present invention is explained with reference to FIG. 1.

Figure 2:
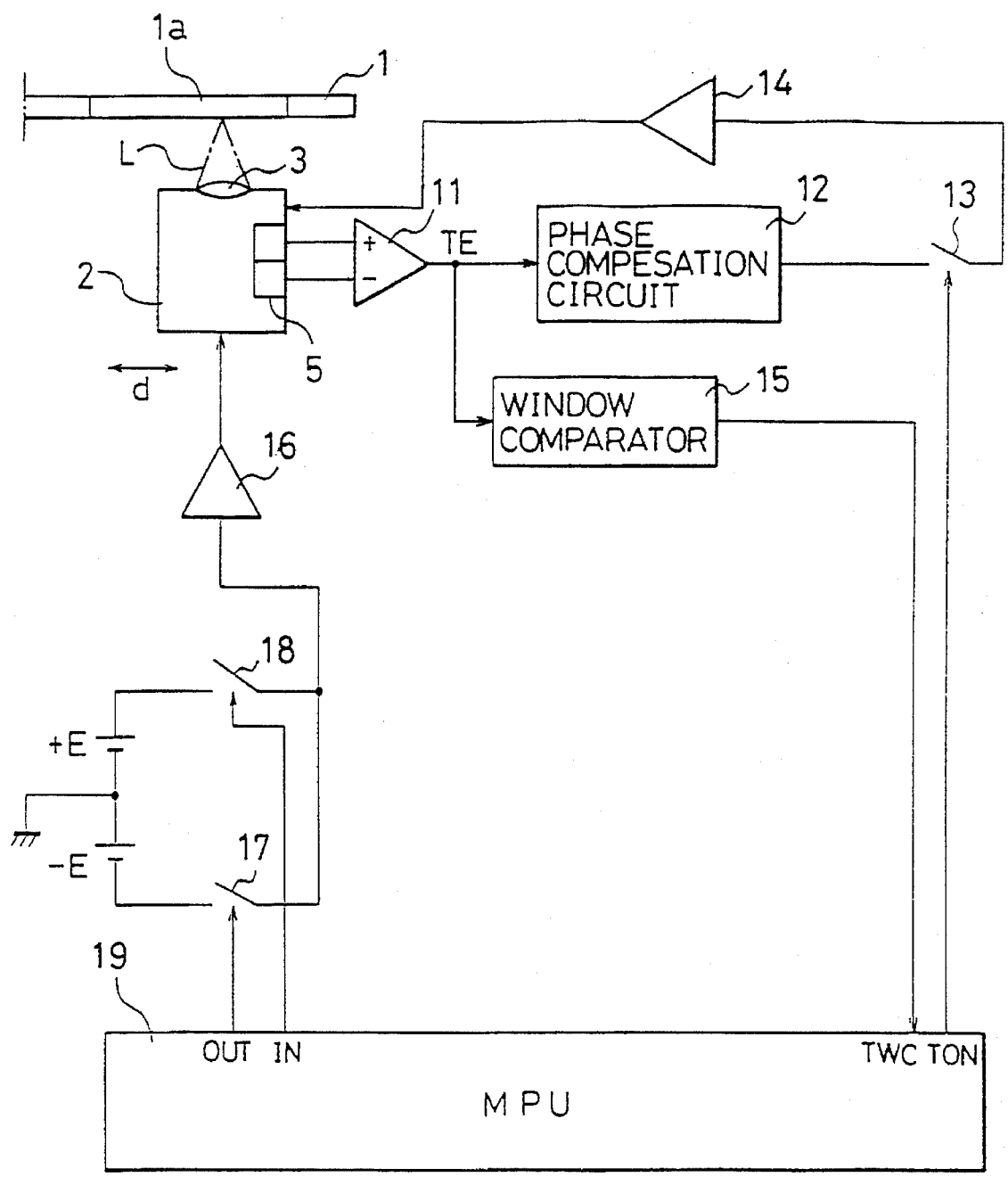
FIG. 2 is a functional block diagram to show a structure of main part of a first embodiment of the tracking control apparatus according to the present invention.

FIG. 2 is a functional block diagram to show a main structure of the first embodiment of the tracking control apparatus according to the present invention. In FIG. 2, elements having the same function as those in FIG. 1 are given the same reference characters and omitted to explain. In FIG. 2, reference character 5 denotes a bisectional photo detector. Reference character 11 denotes a differential amplifier. Reference character 12 denotes a phase compensation circuit. Reference character 13 denotes a change-over switch. Reference character 14 denotes a tracking drive circuit. Reference character 15 denotes a window comparator. Reference character 16 denotes an optical head driving circuit. Reference characters 17 and 18 denote power switches. Reference character 19 denotes a microprocessor unit (MPU). The MPU 19 includes a CPU (central Processing Unit), a ROM (Read Only Memory), a RAM (Ramdom Access Memory) and input/output interface. The CPU serves to control the interpretation and execution of the program instruction on the basis of the program stored in the ROM, which will be explained later by flow charts. Reference characters +E and −E denote positive and negative constant voltage sources, respectively. Reference character TE denotes a tracking error signal. Reference character TWC denotes a detection signal of window comparator 15. Reference characters OUT, IN and TON denote control signals for on-off control of switches 17, 18 and 13, respectively. Switches 17, 18 and 13 are actually electronic switches, for example. Reference character d with bidirectional arrow denotes a moving direction of the optical head 2.

The following is an operation of the tracking control apparatus also common to the conventional apparatus.

An optical spot is kept on the disk 1 by an unrepresented focusing servo means. Using a reflection light of the optical spot from a track grooved in the tracking enable region 1a on the disk 1, a tracking error signal TE is detected by an unrepresented optical system inside the optical head 2, the known bisectional photo detector 5 also inside the optical head 2 and the differential amplifier 11.

The objective lens 3 is driven in the direction of tracking by the tracking error signal TE, the phase compensation circuit 12, and the tracking drive circuit 14, constituting a tracking servo loop to carry out the following of the track by the optical spot.

The above structure and operations are common to the conventional apparatus.

In the tracking control apparatus according to the present invention, the tracking error signal TE detected is also input into the window comparator 15, and the window comparator 15 monitors the tracking error signal TE to judge whether it exceeds a predetermined range between W+ and W− defining threshold levels. If the tracking error signal TE exceeds the threshold level, the window comparator 15 outputs a detection signal TWC.

Figure 3:
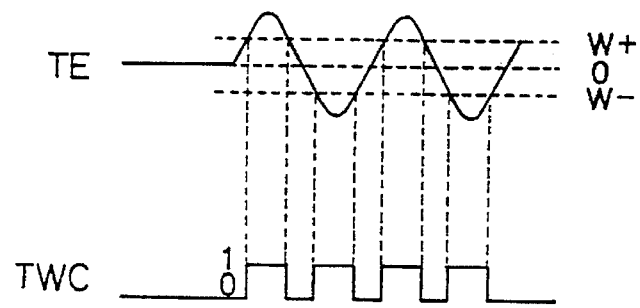
FIG. 3 is a time chart to illustrate a relation between a tracking error signal TE and a detection signal TWC of the window comparator shown in FIG. 2.

FIG. 3 is a time chart to illustrate a relation between the tracking error signal TE and the detection signal TWC of the window comparator 15.

As shown in FIG. 3, when the tracking error signal TE is generated to exceed either one of the threshold levels preliminarily set as the upper limit and the lower limit, an output of the window comparator 15, that is, the detection signal TWC, becomes "1". Otherwise, TWC is kept zero.

Further in FIG. 2, when power switche 18 or 17 is turned on, positive constant voltage +E or negative constant voltage −E is applied to the optical head driving circuit 16 to move the optical head 2 in a radially inward direction or in a radially outward direction of the disk 1. The optical head 2 includes for example a driving motor driven by the driving circuit 16.

The detection signal TWC of the window comparator 15 is input into the MPU 19. The MPU 19 generates control signals OUT, IN and TON for on-off control of the switches 17, 18 and 13, respectively.

The control signal OUT turns on the switch 17 by setting OUT=1 upon moving the optical head in the radially outward direction or to the right on the disk 1. The control signal IN turns on the switch 18 by setting IN=1 upon moving the optical head in the radially inward direction or to the left on the disk 1. The control signal TON goes toward "1" upon the tracking servo action to turn on the switch 13.

Next explained is an operation of the MPU 19.

Figure 4:
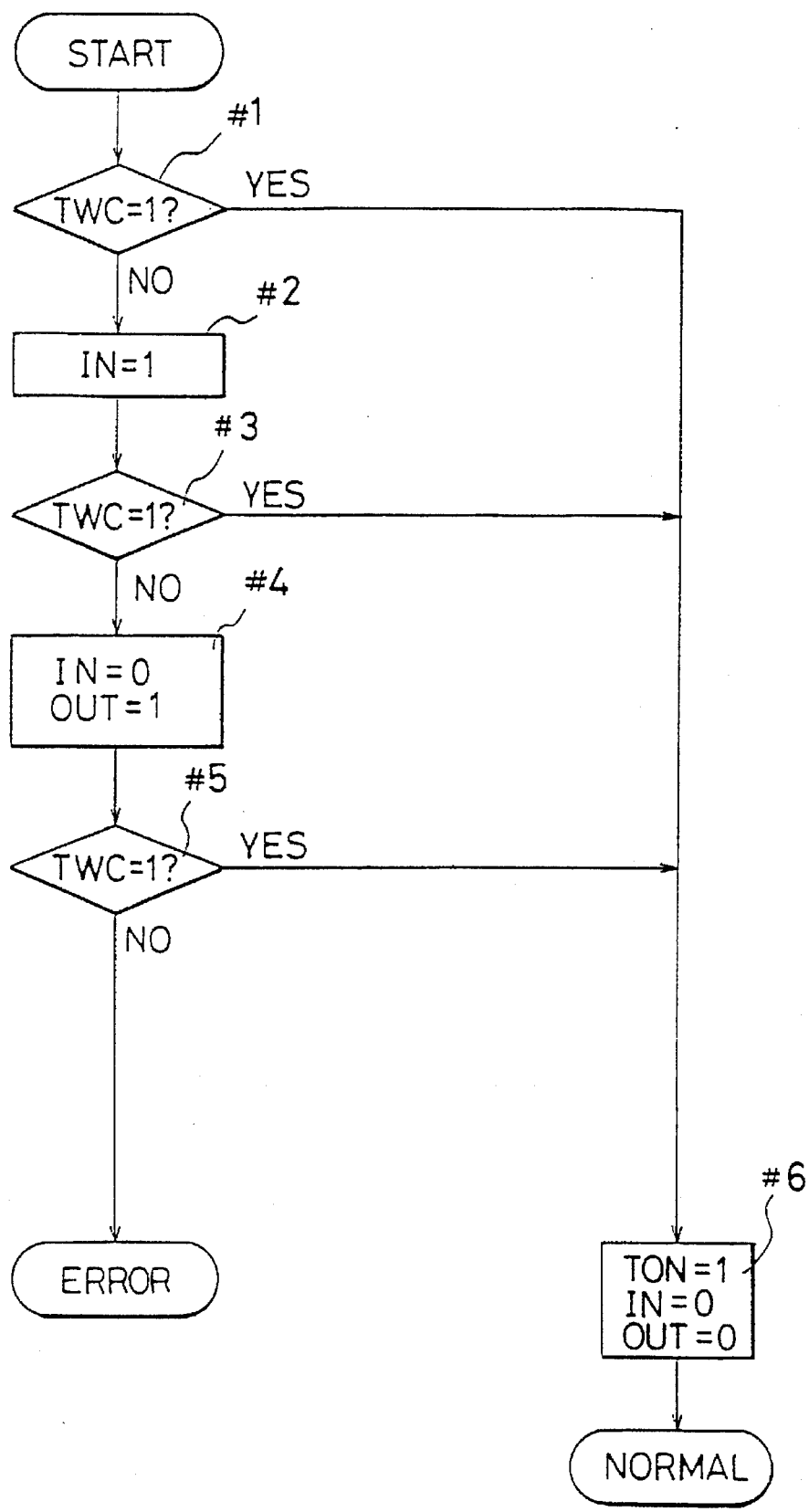
FIG. 4 is a flow chart to show a flow of major processes of the MPU in the first embodiment of the tracking control apparatus.

FIG. 4 is a flow chart to show a flow of major processes of the MPU 19 in the tracking control apparatus according to the present invention. In FIG. 4, #1 through #6 represent steps of operation of the MPU 19.

An initial condition is that the focusing servo has been activated, and the control signals OUT, IN and TON are all zero, i.e. OUT=0, IN=0 and TON=0.

In Step #1, the detection signal TWC of the window comparator 15 is checked. It is judged in Step #1 whether TWC=1 or not. If the TWC is equal to "1", the detection signal TWC of the window comparator 15 is obtained.

If TWC=1, the flow proceeds to Step #6. In Step #6, setting TON=1, IN=0, OUT=0, the tracking servo is activated. In this case, the optical head 2 is located within the tracking enable region 1a of the disk 1, and it is said to be in the normal state.

In addition to simply judging if TWC=1 in the flow of FIG. 4, the time sequence of the detection signal TWC may also be checked if it has the following pattern as "1, 0, 1, 0 . . . " to carry out a more accurate tracking servo.

When the detection signal TWC is not equal to "1", or when the detection signal TWC is not obtained, it is judged that the optical head 2 is out of the tracking enable region and the flow goes to Step #2. In Step #2, the signal IN is set to "1", or IN=1. By IN=1, the power switch 18 is turned on to supply the positive voltage +E so as to move the optical head 2 in the radially inward direction.

In the next Step #3, it is again checked if TWC=1 or not. If TWC=1, the flow proceeds to Step #6 to set TON=1, IN=0 and OUT=0 to perform the tracking servo.

On the contrary, unless TWC=1 after the check in Step #3, which period is for example one second, the flow goes to Step #4 to set IN=0 and OUT=1. By IN=0 and OUT=1, the power switch 17 is turned on to supply the negative voltage −E so as to move the optical head 2 in the radially outward direction.

In the next Step #5, it is again checked whether TWC=1 or not. If TWC=1, the flow goes to Step #6 to set TON=1, IN=0 and OUT=0 to perform the tracking servo control.

Unless TWC=1 after the check in Step #5, which period is for example one second, it is judged that an error occurs. Informed of the fact, the MPU 19 performs a necessary process such as stop of the apparatus.

By the above Steps #1 through #6, the tracking control operation may be smoothly effected wherever the optical head 2 is located in the radial direction of the disk 1.

By the way, the detection signal TWC must be controlled to be almost equal to zero during the tracking servo action.

Then, if TWC=1, or if the tracking error signal over the threshold level is obtained, it can be judged that an abnormal condition has occurred during the tracking servo or pull-in action.

Figure 5:
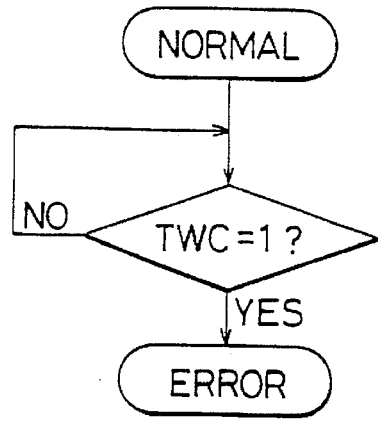
FIG. 5 is a flow chart to show a flow of major processes to monitor an abnormal state during the tracking servo control in the first embodiment of the tracking control apparatus.

A flow of FIG. 5 is for monitoring the abnormal condition during the tracking servo control or servo tracking.

The flow chart in FIG. 5 shows a flow of main processes for monitoring the abnormal condition during the tracking servo control in the tracking control apparatus according to the present invention.

As shown in FIG. 5, the detection signal TWC of the window comparator 15 is checked during the normal tracking servo control. If it is detected that TWC=1, it is judged that an abnormal condition has occurred during the tracking servo control and the fact is signaled out.

Next explained is a second embodiment of the tracking control apparatus according to the present invention.

The tracking control apparatus of the second embodiment has higher grade functions than that of FIG. 2. It can control a relative velocity of the optical spot crossing the tracks.

A relative velocity servo is a circuit provided in the conventional optical disk apparatus to carry out an access operation.

Figure 6:
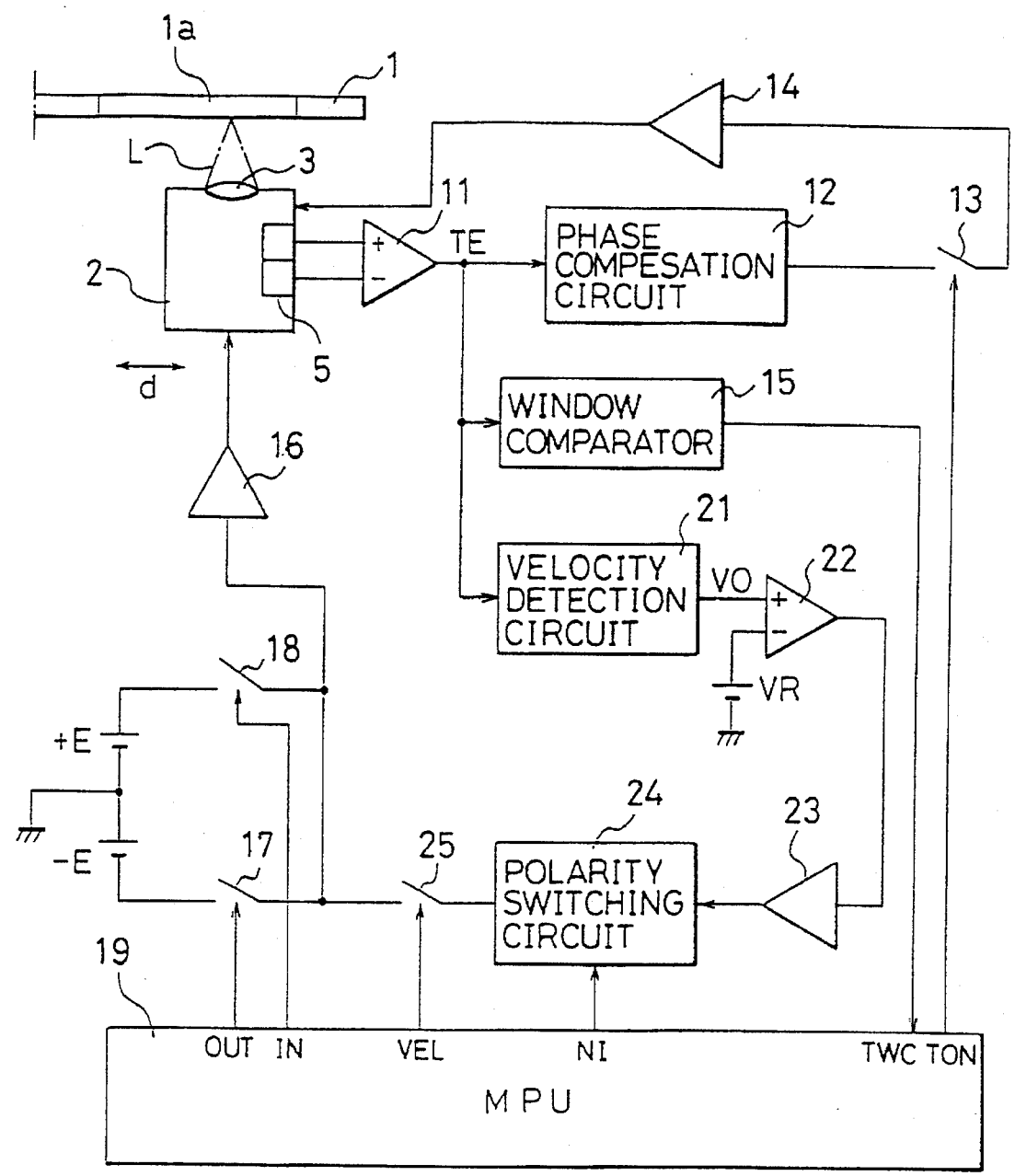
FIG. 6 is a functional block diagram to show a structure of main part of a second embodiment of the tracking control apparatus according to the present invention.

FIG. 6 is a functional block diagram to show a main structure of the second embodiment of the tracking control apparatus according to the present invention. In FIG. 6, elements having the same function as in FIG. 1 are given the same reference characters and omitted to explain. In FIG. 6, reference character 21 denotes a velocity detection circuit. Reference character 22 denotes a differential amplifier. Reference character 23 denotes an amplifier. Reference character 24 denotes a polarity switch circuit (INV). Reference character 25 denotes a change-over switch. Reference character VR denotes a reference voltage source. Reference character VO denotes an output of the detection circuit 21, that is a voltage proportional to a track crossing velocity of the optical head 2. Reference character VEL denotes a control signal for on-off control of the change-over switch 25. And reference character NI denotes a control signal for controlling the polarity of the polarity switch circuit 24.

In addition to the elements of the first embodiment as shown in FIG. 2, the tracking control apparatus of the second embodiment as shown in FIG. 6 further has elements shown in blocks 21 and 24 and circuit symbols 22, 23, 25 and VR, which constitute the main elements of the relative velocity servo. Further, the MPU 19 has additional terminals supplying a control signal VEL for the change-over switch 25 and a control signal NI for the polarity switch 24.

The velocity detection circuit 21 is first explained.

Figure 7:
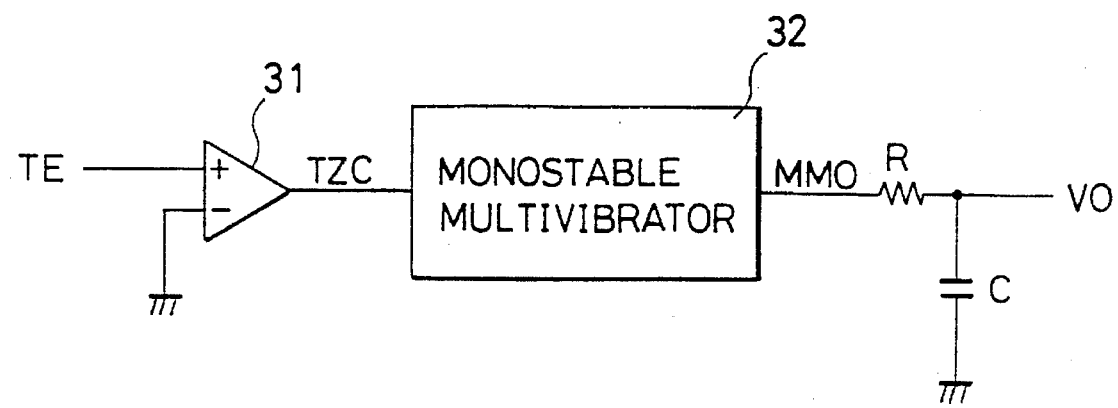
FIG. 7 is a functional block diagram to show an example of internal structure of the velocity detection circuit as shown in FIG. 6.

FIG. 7 is a functional block diagram to show an example of the internal structure of the velocity detection circuit 21 as shown in FIG. 6. In FIG. 7, reference character 31 denotes a zero-crossing comparator. Reference character 32 denotes a monostable multivibrator. Reference characters R and C denote a resistor and a capacitor, respectively. Reference character TZC denotes an output signal of the zero-crossing comparator. Reference character MMO denotes an output signal of the monostable multivibrator 32.

The zero-crossing comparator 31 comprises an operational amplifier without feedback. The tracking error signal TE is supplied to the non-inverting terminal of the operational amplifier, while its inverting terminal is grounded.

The zero-crossing comparator 31 converts the tracking error signal TE into a two-valued square-wave output signal TZC.

The monostable multivibrator 32 is triggered at the leading edge of the signal TZC to generate an output puls signal RIO with a constant pulse width T.

The output signal MMO with the pulse width T is input into an averaging circuit composed of the resistor R and the condenser C to be smoothed therein.

The operation of the velocity detection circuit 21 in FIG. 6, also shown in FIG. 7 in detail, is explained with reference to a time chart of FIG. 8.

Figure 8:
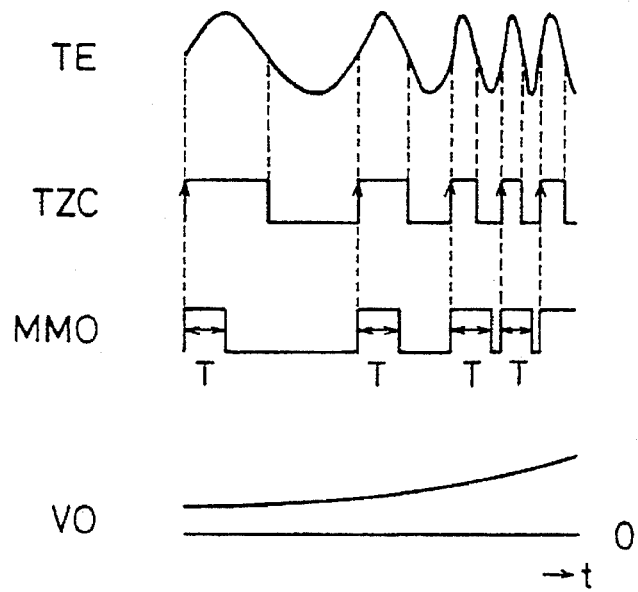
FIG. 8 is a time chart to illustrate an operation of velocity detection circuit as shown in FIG. 7.

FIG. 8 is a time chart to illustrate the operation of the velocity detection circuit as shown in FIG. 7. Reference characters given for respective signal waves in FIG. 8 correspond to the reference characters given in FIG. 7.

As shown by TE in FIG. 8, a tracking error signal TE is for example supposed to be generated.

In this case, the zero-crossing comparator of FIG. 7 generates a two-valued output signal as shown by TZC.

The two-valued output signal TZC is converted by the monostable multivibrator 32, which is triggered at a leading edge of each pulse of TZC, into a pulse signal with a pulse width T as shown by MMO in FIG. 8.

The pulse signal MMO is smoothed by the average value circuit consisting of the resistor R and the condenser C to obtain a detection signal as shown by VO in FIG. 8.

As described above, the detection signal VO is a voltage proportional to the track crossing velocity, and is supplied to + terminal or non-inverting terminal of the differential amplifier 22 in FIG. 6 as a velocity signal.

In FIG. 6, a reference voltage "VR" is supplied to − terminal or inverting terminal of the differential amplifier 22. The differential amplifier 22 compares the velocity signal VO with the reference voltage VR. A comparison result means a deviation from a relative velocity at which the optical head 2 is designed to cross tracks.

An output of the differential amplifier 22, or a comparison result is amplified by the amplifier 23, and then the amplified output is supplied through the polarity switch circuit 24 and the change-over switch 25 to the optical head driving circuit 16.

The optical head 2 is thus controlled to move at a constant relative velocity corresponding to a condition of VO=VR, by feeding back a signal of difference between the voltage VO proportional to the track crossing velocity of the optical head 2 and the reference voltage VR.

The polarity switch circuit 24 outputs an inverted signal when the control signal NI is "1".

If the control signal NI is controlled such that NI=0 during the radially inward movement of the optical head 2, while, if NI=1 during the radially outward movement thereof, such an output is generated that the velocity of the optical head 2 decreases when VO>VR while that the velocity of the optical head 2 increases when VO<VR, which is a negative feedback control effected.

The change-over switch 25 is under an on-off control of the control signal VEL to control switching of relative speed servo.

The operation of the MPU 19 in FIG. 6 is next explained with reference to a flow chart.

Figure 9:
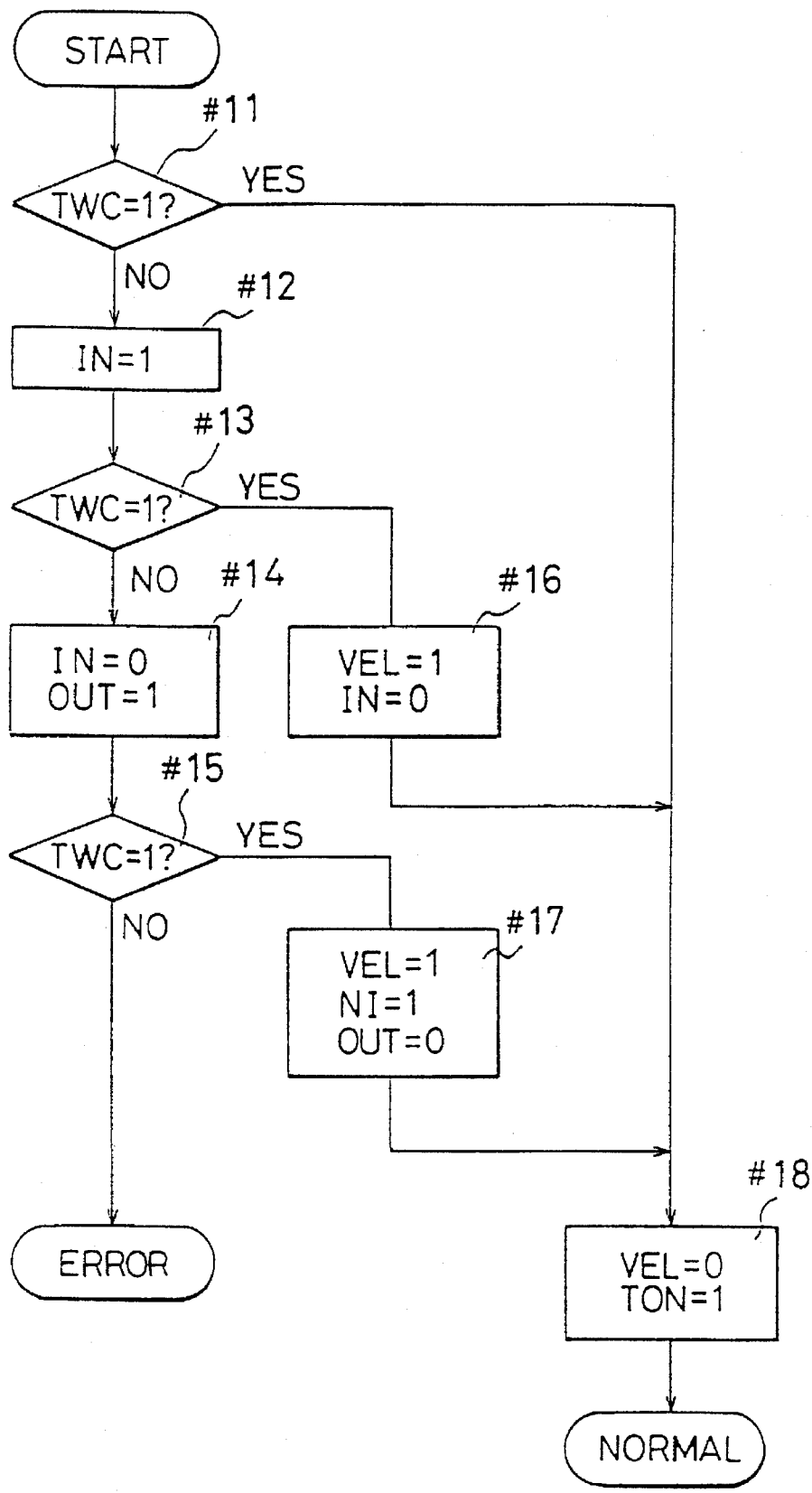
FIG. 9 is a flow chart to show a flow of major processes of the MPU in the second embodiment of the tracking control apparatus as shown in FIG. 6.

FIG. 9 is a flow chart to show a flow of main processes of the MPU 19 in the tracking control apparatus as shown in FIG. 6. In FIG. 9, #11 through #18 represent steps for the processes.

An initial condition is that the focus servo has been activated, and all the control signals OUT, IN, TON and VEL are zero, i.e., OUT=0, IN=0, TON=0 and VEL=0.

In Step #11, the detection signal TWC of the window comparator 15 is checked. That is, it is judged whether TWC=1 or not. If TWC is "1", or if the detection signal TWC of the window comparator 15 is obtained, the relative velocity servo is kept off.

In other words, if TWC=1, the flow goes to Step #18 to set VEL=0, TON=1 to perform the tracking servo control or servo tracking. In this state, the optical head 2 is within the tracking enable region 1a of the disk 1, which is a normal state.

If TWC is not equal to "1" at the check in Step #11, the flow goes to Step #12 to set IN=1. By IN=1, the optical head 2 moves in the radially inward direction.

In next Step #13, it is again checked whether TWC=1 or not. If TWC=1, the flow goes to Step #16.

Step #16 is a case that, after the radially inward movement of the optical head 2 by IN=1 in the preceding Step #12, TWC goes toward "1".

In Step #16, VEL is set to 1 to activate the relative velocity servo. The voltage +E and the output voltage of the polarity switching circuit 24 are added. A conventional voltage adding circuit may be used in FIG. 6.

Back to FIG. 9, if a voltage "VR" of the reference voltage source VR is properly selected in this state, the relative speed is well controlled within a range suitable for tracking control.

The flow thereafter proceeds to Step #18 to set VEL=0, TON=1 to perform the tracking servo.

A reason for adopting the relative velocity servo is to ensure the tracking servo control. Otherwise, the failure of servo tracking or pull-in action could occur due to the increased velocity of the optical head by the continuous application of positive voltage +E or negative voltage −E.

Employing such a relative velocity servo, even though the optical head 2 is excessively accelerated by fluctuation of the constant voltage +E or −E, or by the longer application time of the voltage +E or −E, the velocity is automatically controlled within a range suitable for servo tracking or pull-in, allowing stabler tracking servo.

If TWC is not equal to "1" upon the check in Step #13, which period is for example one second, the flow goes to Step #14 to set IN=0, OUT=1 to move the optical head 2 in the radially outward direction.

In the next Step #15, it is again checked whether TWC=1 or not. IF TWC=1, the flow goes to Step #17 to set VEL=1, NI=1 and OUT=0.

Since this is the case that the optical head is moving in the radially outward direction, NI is set to "1" by the reason as above described.

The flow thereafter goes to Step #18 to set VEL=0, TON=1 to perform the tracking servo.

Unless TWC=1 after the check in Step #15, which period is for example one second, it is judged that an error occurs. Informed of the fact, the MPU 19 performs a necessary process such as stop of the apparatus.

By the above processes in Steps #11 through #18, it becomes possible that the optical head is pulled-in by moving to a position where the tracking control is possible no matter where the optical head 2 is located.

In the second embodiment, an abnomal condition may also be monitored during the tracking servo control in the same manner as in the flow of FIG. 5.

According to the present invention, when a tracking error signal is not obtained, the optical head is moved in the radially inward or outward direction to obtain a tracking error signal, and thereafter the tracking servo action is carried out, so that the stable tracking may be effected no matter where the optical disk is initially located, especially without any position sensor or switch for the optical head.

Further, the relative velocity controlling means may be added to maintain the relative velocity below a predetermined value during the tracking control action. This arrangement allows stabler tracking control accordingly.

Also, abnomal conditions may be detected during the tracking servo control by judging whether the tracking error signal is obtained over a threshold level, so that the detection of abnomal conditions may be readily executed by a small scale circuit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A tracking control apparatus for an optical disk apparatus having an optical head with an objective lens emitting a light beam on a disk for reading information from a track formed on the disk having a tracking enable region where guide grooves, servo marks or the like are formed and a region outside the tracking enable region both within an optical head moving range, comprising:

optical head moving means for moving the optical head relative to the disk in a radial direction thereof;

tracking error signal detecting means for detecting a tracking error signal based on a reflection light from the disk;

tracking servo means for performing a tracking servo control to position the optical head relative to the track in response to said tracking error signal;

tracking error signal judging means for judging whether said tracking error signal exceeds either one of threshold levels defined by a predetermined range between upper and lower limits; and controlling means for controlling said optical head moving means and tracking servo means based on a judgement result by said tracking error signal judging means such that where the tracking error signal does not exceed either one of said predetermined threshold levels at an initial condition before said tracking servo control is activated, said optical head is moved inwardly or outwardly in the radial direction of the disk toward the tracking enable region until the tracking error signal exceeds either one of said predetermined threshold levels, such that where the tracking error signal does not exceed either one of said predetermined threshold levels during a predetermined period at the initial condition, even though the optical head has been moved inwardly or outwardly in the radial direction of the disk, said optical head is moved oppositely in the radial direction of the disk toward the tracking enable region until he tracking error signal exceeds either one of said predetermined threshold levels, and such that where the tracking error signal exceeds either one of said predetermined threshold levels, said tracking servo control is activated to position the optical head relative to the track.

2. A tracking control apparatus according to claim 1, wherein said controlling means generates an error signal indicating an abnormal condition, after the optical head has been moved oppositely in the radial direction and the tracking error signal still does not exceed either one of the predetermined threshold levels.

3. A tracking control apparatus according to claim 2, wherein said controlling means generates an error signal indicating an abnormal condition, once the tracking error signal exceeds either one of the predetermined threshold levels during the tracking servo control.

4. A tracking control apparatus according to claim 1, wherein positive and negative constant voltage sources move the optical head in the radial direction at the initial condition.

5. A tracking control apparatus for an optical disk apparatus having an optical head with an objective lens emitting a light beam on the disk for reading information from a track formed on the disk having a tracking enable region where guide grooves, servo marks or the like are formed and a region outside the tracking enable region both within an optical head moving range, comprising:

optical head moving means for moving the optical head relative to the disk in a radial direction thereof;

tracking error signal detecting means for detecting a tracking error signal based on a reflection light from the disk;

tracking servo means for performing a tracking servo control to position the optical head relative to the track in response to said tracking error signal;

tracking error signal judging means for judging whether said tracking error signal exceeds either one of threshold levels defined by a predetermined range between upper and lower limits;

relative velocity servo means for controlling the optical head to move at a constant velocity in the radial direction; and controlling means for controlling said optical head moving means, tracking servo means and relative velocity servo means based on a judgement result of the tracking error signal judging means such that where the tracking error signal does not exceed either one of said predetermined threshold levels at an initial condition before said tracking servo control is activated, said optical head is moved inwardly or outwardly in the radial direction of the disk toward the tracking enable region until the tracking error signal exceeds either one of the predetermined threshold levels, such that where the tracking error signal does not exceed either one of said predetermined threshold levels during a predetermined period at the initial condition, even though the optical head has been moved inwardly or outwardly in the radial direction of the disk, said optical head is moved oppositely in the radial direction of the disk toward the tracking enable region until the tracking error signal exceeds either one of said predetermined threshold levels, and such that where the tracking error signal exceeds either one of said predetermined threshold levels, the relative velocity servo is activated to move said optical head at the constant velocity, and then said tracking servo control is activated to position the optical head relative to the track.

6. A tracking control apparatus according to claim 5, wherein said controlling means generates an error signal indicating an abnormal condition, after the optical head has been moved oppositely in the radial direction and the tracking error signal still does not exceed either one of the predetermined threshold levels.

7. A tracking control apparatus according to claim 6, wherein said controlling means generates an error signal indicating an abnormal condition, once the tracking error signal exceeds either one of the predetermined threshold levels during the tracking servo control.

8. A tracking control apparatus according to claim 5, wherein positive and negative constant voltage sources move the optical head in the radial direction at the initial condition.

9. A tracking control apparatus according to claim 8, wherein said relative velocity servo means comprises a velocity detection circuit for detecting the moving velocity of the optical head, a comparing circuit for comparing the moving velocity detected by the velocity detecting means with a predetermined value, and a polarity switching circuit for switching the polarity of the output signal of the comparing circuit, the output of the polarity switching circuit being used to move the optical head at the constant velocity in the radial direction.

* * * * *